(12) United States Patent
Harrison et al.

(10) Patent No.: US 9,479,216 B2
(45) Date of Patent: Oct. 25, 2016

(54) SPREAD SPECTRUM METHOD AND APPARATUS

(71) Applicants: Stephen Harrison, Victoria (CA); Peter F. Driessen, Victoria (CA)

(72) Inventors: Stephen Harrison, Victoria (CA); Peter F. Driessen, Victoria (CA)

(73) Assignee: UVic Industry Partnerships Inc., Victoria, BC (CA)

( * ) Notice: Subject to any disclaimer, the term of this patent is extended or adjusted under 35 U.S.C. 154(b) by 0 days.

(21) Appl. No.: 14/811,662

(22) Filed: Jul. 28, 2015

(65) Prior Publication Data
US 2016/0056858 A1    Feb. 25, 2016

Related U.S. Application Data

(60) Provisional application No. 62/029,856, filed on Jul. 28, 2014.

(51) Int. Cl.
*H04B 1/707* (2011.01)
*H04B 1/692* (2011.01)
*H04B 1/69* (2011.01)

(52) U.S. Cl.
CPC ............. *H04B 1/707* (2013.01); *H04B 1/692* (2013.01); *H04B 2001/6908* (2013.01)

(58) Field of Classification Search
CPC ............. H04L 29/0604; H04B 1/707; H04B 2201/707; H04J 2011/0006; H04J 2011/0009; H04J 2011/0013; H04J 2011/0016
USPC ................ 375/149, 259, 240, 140, 260, 295
See application file for complete search history.

(56) References Cited

U.S. PATENT DOCUMENTS

| | | | | |
|---|---|---|---|---|
| 5,010,558 A * | 4/1991 | Yost | ...................... | H03M 13/05 375/259 |
| 5,394,473 A * | 2/1995 | Davidson | ............ | G10L 19/0212 375/240 |
| 5,977,991 A * | 11/1999 | DeGoricija | ............ | G09G 5/395 345/536 |
| 8,630,861 B2 * | 1/2014 | Chen | ................... | G10L 19/0017 341/51 |
| 9,031,834 B2 * | 5/2015 | Coorman | .............. | G10L 13/033 704/205 |
| 9,368,123 B2 * | 6/2016 | Srinivasan | ............ | G10L 19/018 |
| 2007/0299657 A1 * | 12/2007 | Kang | .................... | G10L 19/008 704/207 |
| 2009/0238578 A1 * | 9/2009 | Taylor | .............. | H04B 10/25133 398/147 |
| 2015/0213804 A1 * | 7/2015 | Koishida | ............... | G10L 19/167 704/500 |

OTHER PUBLICATIONS

Alimohammad et al., "Compact Rayleigh and Rician fading simulator based on random walk processes," IET Communications, 3:1333-1342 (2009).
Kourtis et al., "Analogue time division multiplexing," *Int. J. Elect.*, 74:6, pp. 901-907 (1993).
Martin and Thepault, "An analog time-division multiplexing system," 3rd European Solid State Circuits Conference (ESSCIRC'77), pp. 162-163 (1977).

* cited by examiner

*Primary Examiner* — Emmanuel Bayard
(74) *Attorney, Agent, or Firm* — Klarquist Sparkman, LLP

(57) ABSTRACT

A spread spectrum communications method is based on time compression in which a sampled message signal at a first rate is transmitted at a higher sampling rate. Robustness is achieved by dividing the signal into overlapping segments, transmitting each segment fast enough so that the segments no longer overlap. The segments are received and the data signal reconstructed by overlap-adding the segments.

40 Claims, 17 Drawing Sheets

SPREAD SPECTRUM METHOD AND APPARATUS

CROSS REFERENCE TO RELATED APPLICATION

This application claims the benefit of U.S. Provisional Application No. 62/029,856, filed Jul. 28, 2014, which is incorporated herein by reference in its entirety.

FIELD

The disclosure pertains to data communication systems.

BACKGROUND

Communication systems using time compression are described in Martin and Thepault, "An Analog Time-Division Multiplexing System," 3rd European Solid State Circuits Conference (ESSCIRC'77), pp. 162-163 (1977) and Kourtis et al., "Analogue time division multiplexing," Int. J. Elect. 74.6, pp. 901-907 (1993). McGibney, "Analog radio system with acoustic transmission properties," U.S. Pat. No. 6,606,312 discloses segmenting a voice signal and compressing the segments in time before transmission through a radio channel, but is limited to voice transmission. Additional improvements are needed for the realization of practical systems based on time compression.

SUMMARY

Disclosed herein are representative data communication methods and apparatus that offer certain advantages with respect to conventional direct sequence, frequency hopping, chirped, and time hopping spread spectrum techniques, or ultra-wideband pulse radio techniques. The disclosed methods and apparatus can be used with time division multiple access (TDMA) and code division multiple access (CDMA) techniques as well. As disclosed in detail below, overlap-adding segments is used to increase robustness.

In typical examples, time compression is used, wherein a sampled message signal is transmitted at a higher sampling rate than an initial message rate. Robustness is achieved by dividing the message signal into overlapping segments, and transmitting each segment at a rate such that segments no longer overlap, receiving these segments and reconstructing the message by overlap-adding the segments. The spreading factor is the inverse of the fractional hop size, or one minus the normalized amount of overlap relative to the segment length. For segments almost fully overlapping with overlap of all samples but one (a hop size of one sample), the spreading factor is equal to the segment length. The segments may be windowed, tapering to zero at the edges. As an example, for a voice signal sampled at 8 kHz and segments of 8000 samples, and hop size of one sample, the samples are transmitted at 64 Msample/sec. This wideband signal can be transmitted at baseband or on a carrier. The samples could be transmitted at an integer multiple N times 64 Msample/sec to obtain N TDMA channels.

An advantage of some disclosed schemes is that the transmitted samples need not be recovered exactly. The message signal is effectively resampled at the receiver, so sample misalignment and slight clock drift will not significantly alter the quality of the recovered message. Thus frame alignment overhead may not be required, since the periodicity of the windowed frames can define frame boundaries with sufficient accuracy.

In some examples, signals are spread to reduce or eliminate flat fading by spreading over a much wider bandwidth so as to experience frequency-selective fading. Adaptive equalizers for frequency selective channels can then be applied. In the case of a time-varying frequency-selective channel, the overlap-add process naturally reduces the effect of the channel response.

Methods for spread spectrum communication comprise dividing a message signal to be transmitted into a series of overlapping segments having a predetermined length and overlap. The segments are transmitted at a rate at least high enough to accommodate the added redundancy, whereby the transmitted signal bandwidth is spread by a factor proportional to the increase in rate. Received segments are assembled based on the overlap to recover the message signal. In some examples, the rate is increased more than necessary in order to accommodate a plurality of message signals. In other examples, a sequence is applied at the transmitter that permits the receiver to reject interfering signals from among a plurality of transmitted signals.

A spread spectrum modulation apparatus comprises a data input for sequentially inputting a plurality of data samples to be modulated. A data sample separator divides the data samples into a series of overlapping segments having a predetermined length and overlap. A convertor transforms the overlapping segments of the data samples into a continuous waveform, whereby the bandwidth of the signal is spread by a factor related to the overlap of the segments due to the added redundancy. In some examples, the data samples are input by an analog-to-digital converter. In other examples, the data samples are generated digitally. In some examples, the output signal is further modulated onto a carrier signal. Time domain multiplexing can be achieved by spreading the bandwidth of the signal by a factor greater than required by the predetermined overlap, in order to multiplex signals from multiple sources. In some cases, guard time is added between the segments in order to limit the effect of signal impairments due to the physical channel such as multipath. In other embodiments, a marker sequence is added to some or all of the segments and/or the segments are windowed so as to taper to or toward zero at the segment edges.

A spread spectrum demodulation apparatus comprises a data input for converting a continuous waveform into a plurality of data samples so as to produce a data stream. A data processor identifies the data segments in the stream and assembles overlapping data segments into a message signal for communication by a data output. In some examples, the received signal contains signals from multiple sources and a demultiplexer separates the input signal into the associated signals. In some cases, the segments are identified based on a window shape or a marker. In a representative example, the receiver is enabled for a predetermined time interval in a synchronized manner so as to receive segments from one or more desired programs from a plurality of programs contained within a TDMA signal. The remainder of the time the receiver can be in a disabled state allowing it to consume less power than required in the enabled state. Time in the disabled state can be set by a fixed interval or by a predetermined sequence.

The foregoing and other objects, features, and advantages of the disclosed technology will become more apparent from the following detailed description, which proceeds with reference to the accompanying figures.

BRIEF DESCRIPTION OF THE DRAWINGS

FIG. 6 illustrates a transmitter and FIG. 7 illustrates a receiver.

DETAILED DESCRIPTION

Figure 1:
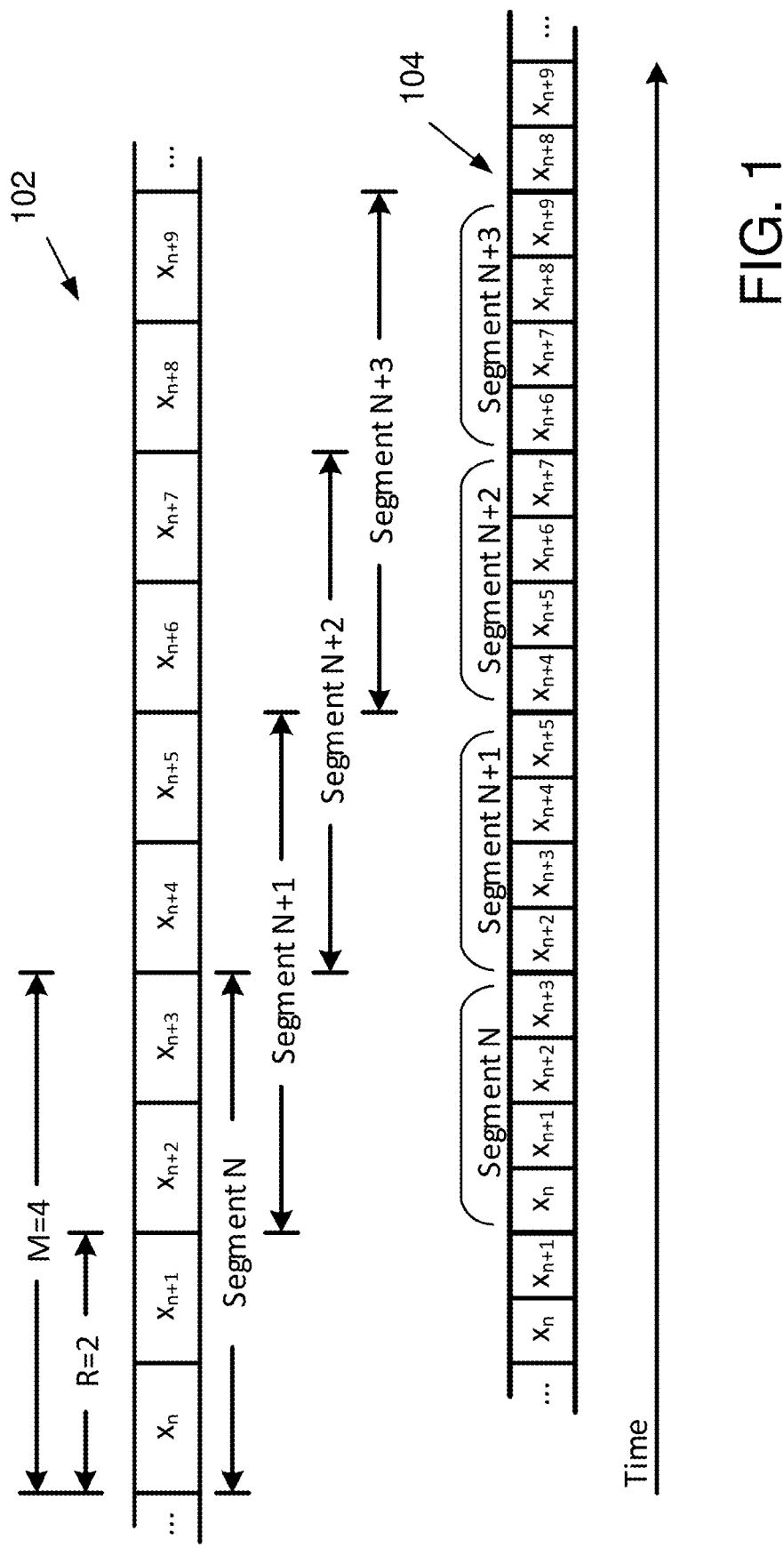
FIG. 1 illustrates overlapping segments at a lower sample rate assembled into a stream of non-overlapping segments at a higher sample rate.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

For convenient description, the examples below are described with reference to digital messages, but messages can be provided as analog waveforms. In some cases, the message is produced as an output of a digital to analog convertor, or messages can be formed as sequences of digital symbols.

Overview

A stream of data samples at a message sample rate $f_m$ is divided into a series of overlapping segments with a fractional hop size $\delta$ as in Eq. (1), wherein R is the hop size in samples and M is the length of the segment in samples. The samples may be sourced from an analog-to-digital converter (ADC), retrieved based on values stored in a file in a computer-readable medium such as RAM or other memory device, or generated algorithmically.

$$\delta = \frac{R}{M} \quad (1)$$

The overlapping segments are then reassembled into a stream of non-overlapping segments for transmission at some higher channel sample rate $f_c$ as in Eq. (2).

$$f_c = \frac{f_m}{\delta} = \frac{f_m M}{R} \quad (2)$$

This relationship ensures that each segment is compressed in time by a factor of $$\frac{f_c}{f_m}$$

such that M samples at $f_c$ occupy the same time duration as R samples at $f_m$. This process is illustrated pictorially in FIG. 1 with the parameters M=4 and R=2. An input data stream 102 is segmented to produce an output data stream 104 with overlapping segments. Discounting (for now) any sharp discontinuities at the segment boundaries, the signal bandwidth is spread by a factor of $\delta^{-1}$.

Figure 13:
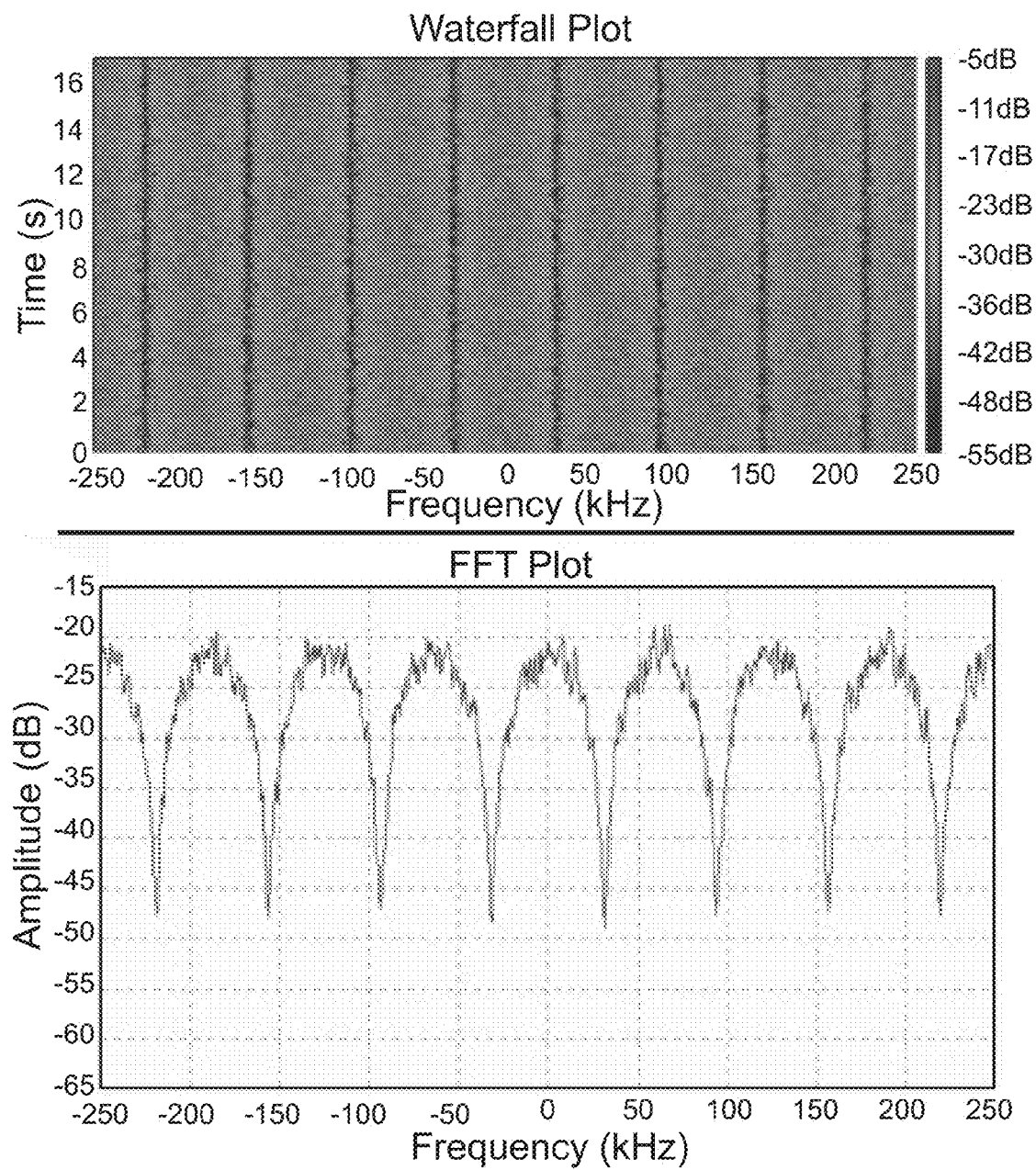
FIG. 13 illustrates 500 kHz channel response with nulls spaced every 62.5 kHz.

A receiver reverses this process by overlapping and adding the segments to reconstruct the original message signal scaled by a constant $\delta^{-1}$, due to the redundancy added in the transmission process. The receiver process performs an expansion in time which is equivalent to a compression in frequency. Thus any channel impairments, including interference, will also be compressed in frequency. For example, FIG. 13 shows the response of a simple static two-ray channel model with a bandwidth of 500 kHz given a white noise input. The nulls in this channel model are spaced by 62.5 kHz.

Figure 14:
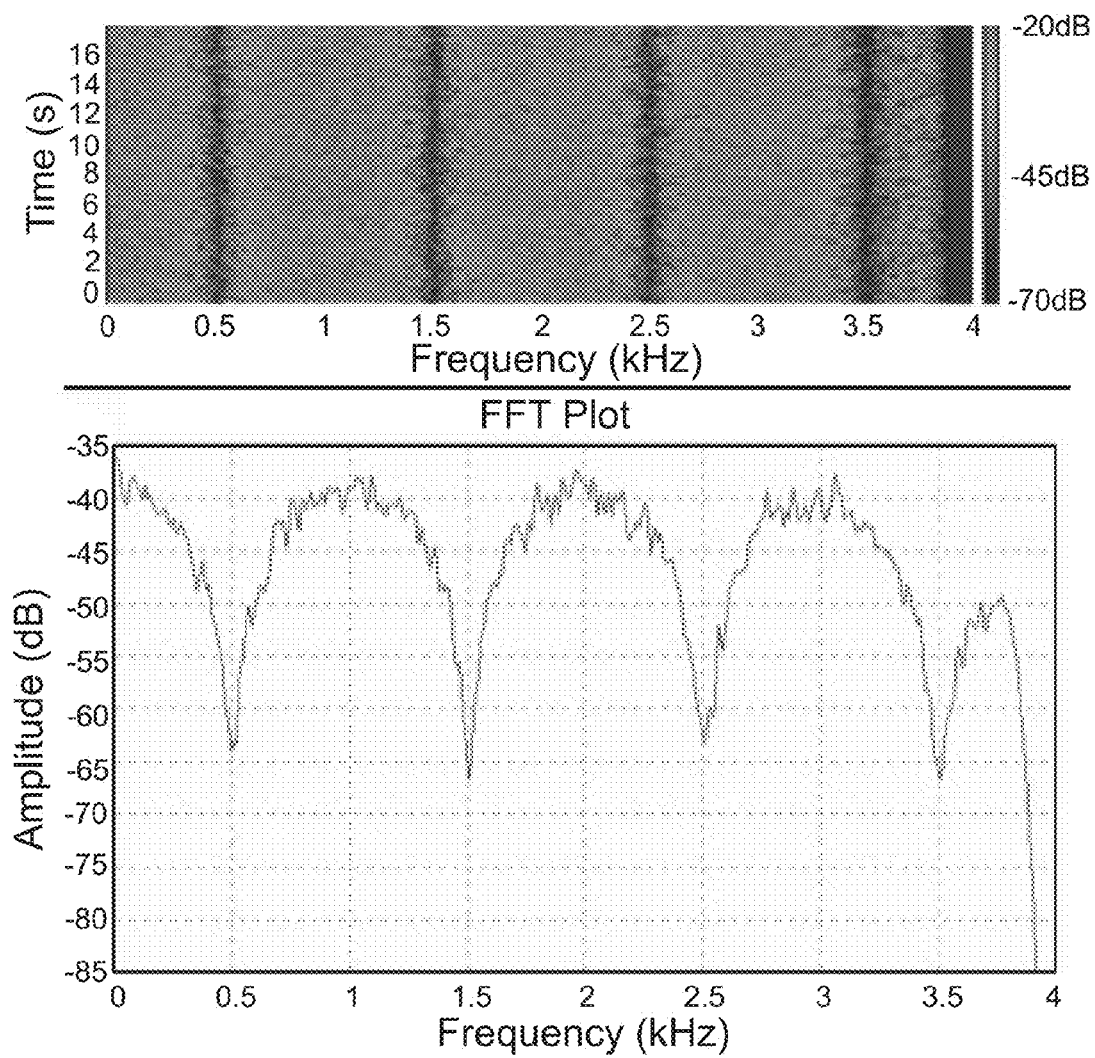
FIG. 14 illustrates output response to the system using the channel of FIG. 2. Nulls are spaced by 1 kHz.

If white noise in then applied as the input to an interleaving system as described with an input rate of $f_1=8$ kHz and an output (a serialized, overlapped and segmented rate) $f_2=500$ kHz and the serialized data transmitted over this channel, the result will be as in FIG. 14. The nulls are now spaced by 1 kHz, compressed in frequency by exactly the ratio of the sample rates.

Clearly this discussion extends to time-varying channels but the results are not as easy to interpret pictorially as in the static case. This is again due to the averaging effect of the overlap-add process. Consider a time-varying frequency-selective channel where the response is relatively constant over the duration of each frame (at RF) but varies significantly over the duration of each windowed segment (at the original sample rate). The duration of the original segment acts as an averaging period which diminishes the influence of the channel state during any one frame. This effect increases as $\delta$ decreases.

Typically, a window function is applied to each segment, either prior to transmission or after segment identification at a receiver (or at both the transmitter and the receiver). Typical windows include trapezoidal, Blackman, Hanning, Hamming, Kaiser, Sleipian, Tukey, Gaussian, confined Gaussian, sine, or other windows. In general, suitable windows are defined as functions of time that are non-zero during a segment length, typically having small (often zero) values at window ends, and maximum values at or near a window center.

Extension to TDMA

Allowing $f_c$ to be greater than the minimum required in Eq. (2) provides some unused portion of time that can be used to interleave segments from additional sources. Stated another way, frequency $f_c$ can be set to accommodate multiple signals, possibly with differing sample rates and fractional hop size parameters as in Eq. (3).

$$f_c = \sum_{k=1}^{n} \frac{f_{m_k}}{\delta_k} \tag{3}$$

Figure 2:
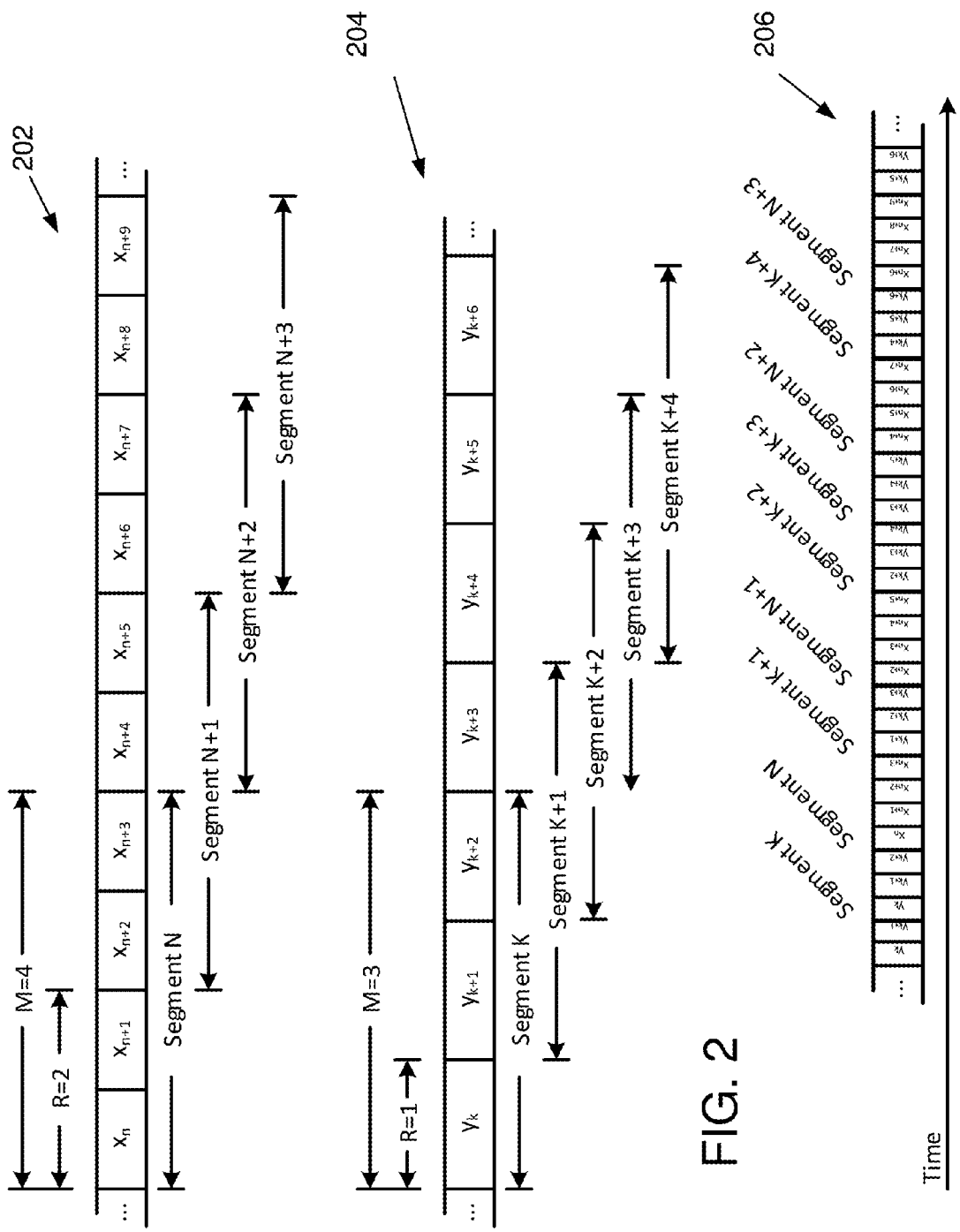
FIG. 2 illustrates time-domain interleaving from multiple sources. The sample rate of Y is 3/4 that of X.
Figure 12:
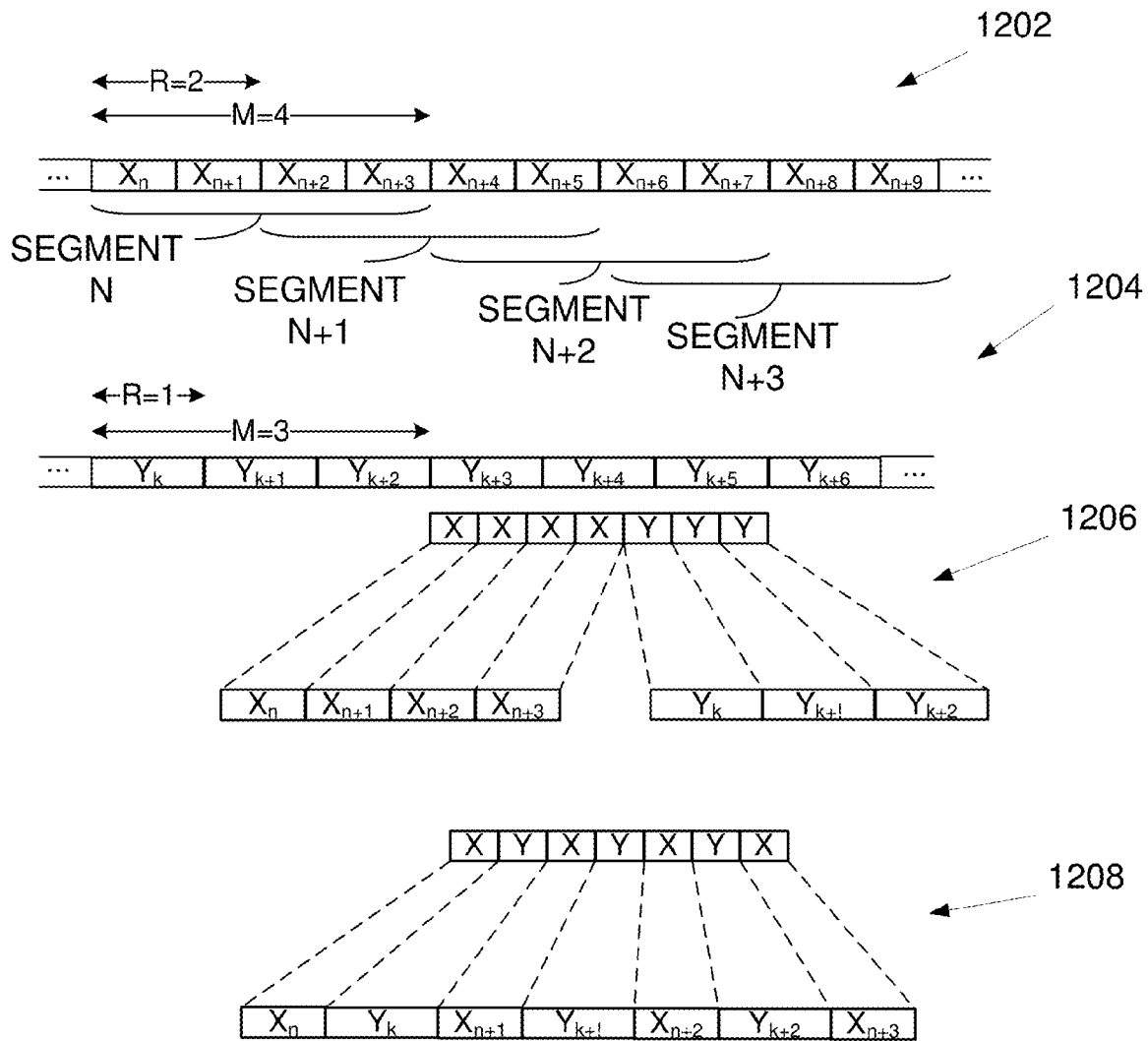
FIG. 12 illustrates representative arrangements of segments to form a serial data streams.

This time interleaving of this manner is illustrated in FIG. 2, where signal X uses the parameters M=4 and R=2 while signal Y uses the parameters M=3 and R=1. The sample rate of Y is 3/4 that of X. The output sample rate is therefore $$f_c = \frac{17}{4} f_{m_x}$$

by application of Eq. (3). FIG. 2 illustrates segmentation and overlapping of data streams 202, 204 to form a combined data stream 206 in which segments of the data stream 202 (the X stream) are interleaved with segments from the data stream 204 (the Y stream). FIG. 12 shows data streams 1202, 1204 that are segmented and overlapped to form a data stream 1206 in which segments associated with the streams 1202, 1204 are interleaved segment by segment. In a data stream 1208, segments associated with the streams 1202, 1204 are interleaved data element by data element.

Extension to CDMA

In the case that multiple systems are transmitting on a common frequency they can be separated by applying a varying phase to each transmitted segment. The opposite phase is then applied to the segments at the receiver to rotate the segment back to 0 degrees. The sequences can be chosen to maximize rejection of some or all interfering signals.

Figure 3:
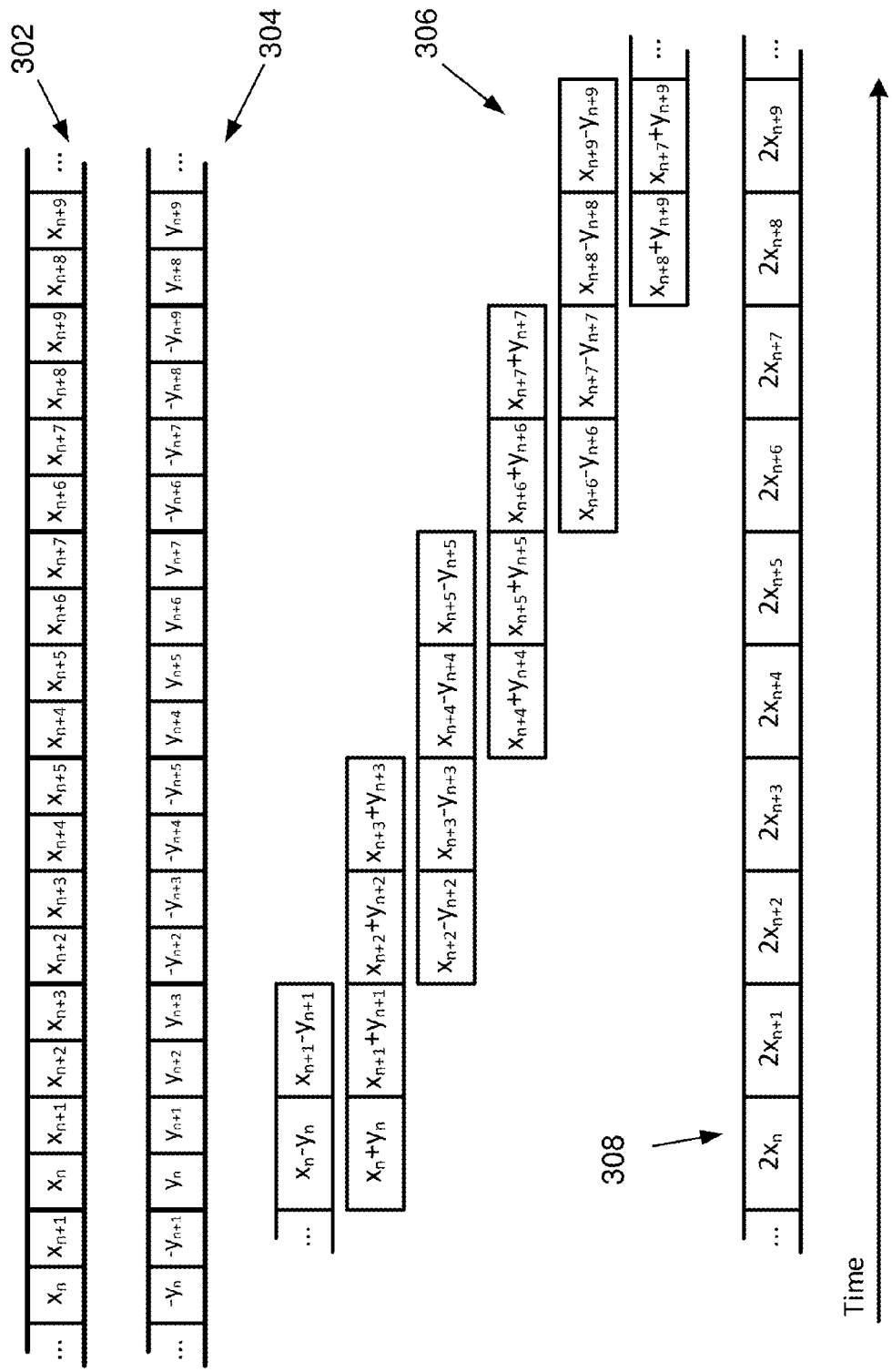
FIG. 3 illustrates two systems transmitting simultaneously. Signal X has the sequence {1, 1, . . . } applied while signal Y has the sequence {1, −1, . . . } applied to the transmitted frames. The sequence applied to Y causes it to be cancelled out in the receiver for X.

FIG. 3 illustrates this concept pictorially, in a simple system with two transmitters operating with the same parameters. The sequence $\{1, 1\}$ is applied to the transmitted frames of X, while the sequence $\{1, -1\}$ is applied to the transmitted frames of Y. This allows the receiver for X to effectively cancel out Y. This scheme extends to the set of sequences from the Hadamard matrix H ($2^k$) with the additional constraints that the number of windows that overlap to produce each output sample must be an integer multiple of the sequence length. This can be expressed in terms of the fractional hop size $$\delta = \frac{1}{n2^k},$$

wherein n is a positive integer, allowing up to $2^k$ message signals to be separated. However, there are other ways to generalize this concept and it is not limited to binary phase sequences. As shown in FIG. 3, data streams 302, 304 are divided into segments 306, and a recovered data stream 306 corresponds to the data stream 302. The data stream 304 can be recovered in addition to or instead of the data stream 302.

This technique differs from direct sequence spread spectrum (DSSS) in that it does not significantly expand the transmitted signal bandwidth. In DSSS, the sequence is applied at a chip rate which is much higher than the symbol rate. In this scheme the sequence is applied at the frame rate.

Windowing

A window function that tapers to zero is applied to each transmitted segment to address practical concerns about synchronization of the segments at the receiver as well as limiting the transmitted bandwidth. Using a rectangular window as in the previous discussion without perfect synchronization at the receiver would result in sharp transients in the output (audible "glitches" in the case of an audio signal) where the windows are not perfectly aligned. The transmitted signal would also contain high frequency and therefore wide bandwidth transients at the segment boundaries.

The Hanning window Eq. (4) is a one choice as the windows sum to some constant positive integer k per Eq. (5) for any hop size R which satisfies the perfect overlap-add criteria of Eq. (6).

$$w(n) = \frac{1}{2}\left(1 - \cos\left(\frac{2\pi n}{M-1}\right)\right) \quad (4)$$

$$\sum_{m=-\infty}^{\infty} w(n - mR) = k \quad (5)$$

$$R = \frac{M}{2k} \quad (6)$$

A drawback of this window choice is that the maximum fractional hop size is 0.5, leading to a minimum SNR loss of 3 dB over conventional transmission. This is due to the doubling the receiver bandwidth simply to recover the message signal at unity gain.

Figure 4:
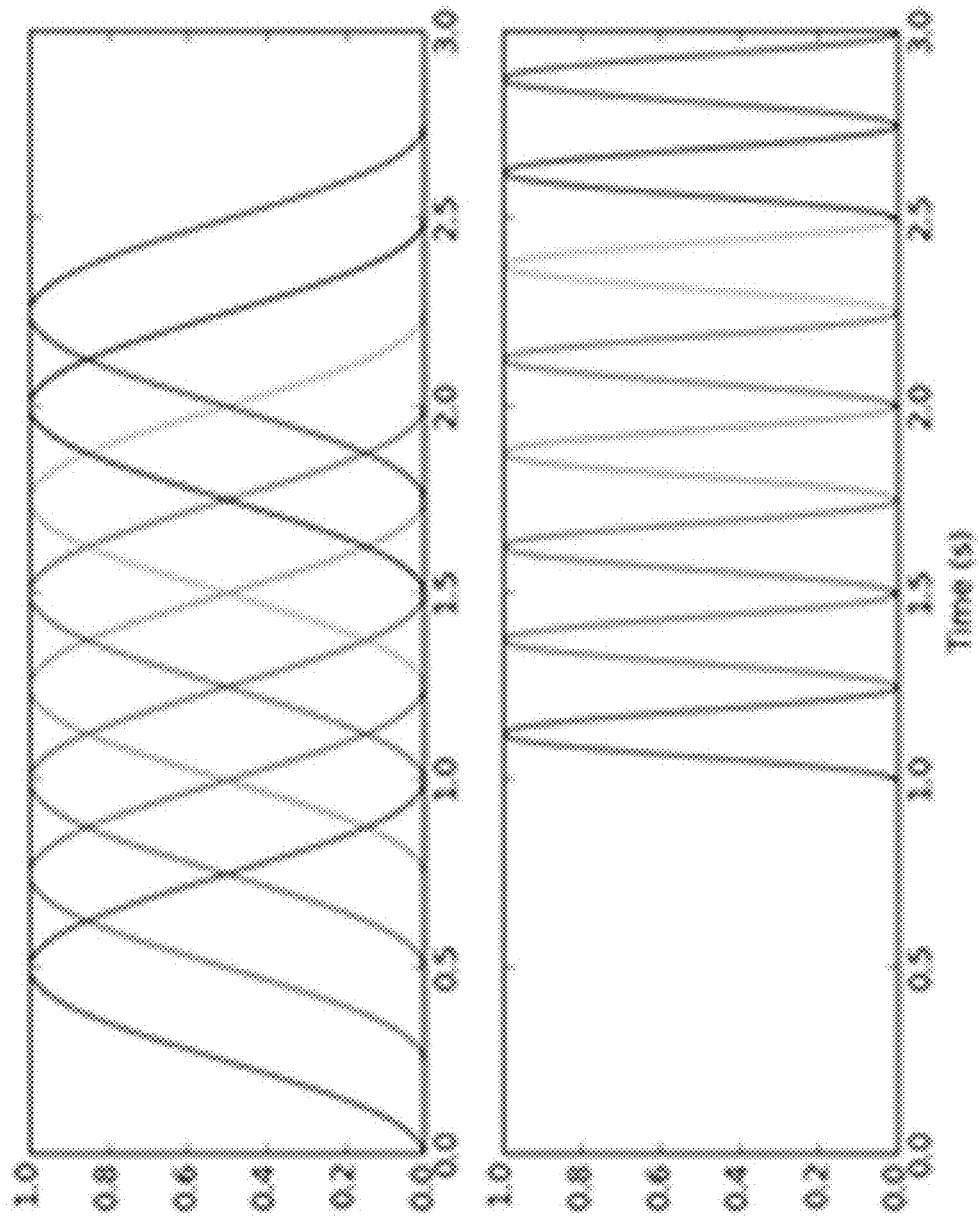
FIG. 4 illustrates overlapping Hanning windows with fractional hop size of 0.25. These windows sum to k=2. The non-overlapping form is also shown.

FIG. 4 illustrates overlapping Hanning windows with fractional hop size of 0.25. These windows sum to k=2. The non-overlapping form is also shown, illustrating the waveform as it would appear when the segments are transmitted at the higher rate.

Interference Rejection

Consider the case where the received segments have an interfering signal superimposed on them. Assume that the overlap-add process sufficiently decorrelates the interfering signal in each segment such that they can be assumed to add in power as with noise. In this case the interference is rejected by a factor of $k \propto \delta^{-1}$. Clearly, one can imagine a scenario where the above assumption is not true. For example, consider an interfering carrier where the interference adds up in phase in the overlap-add process. In this situation, the transmitter can apply a random or predetermined phase sequence to each segment. In the process of rotating each segment back to 0 degrees, the receiver effectively decorrelates this carrier.

Synchronization

A synchronization marker can be inserted between the segments to aid in locating the start and end of each segment in the received sample stream. The sample rate $f_1$ must be increased to accommodate this insertion. Each timing marker then delineates a frame consisting of one or more segments. The marker that is added should have a strong correlation peak in order to locate the segments with minimum jitter. Segments from multiple interleaved sources can be identified with different timing markers or by including some modulated digital data with the timing marker.

In practice, $f_m$ and $f_c$ at the transmitter will vary slightly from $f'_m$ and $f'_c$ at the receiver. In an ideal system, the number of samples between correlation peaks could be used to estimate the transmitter's sample rate and modulate the receiver's sample rate accordingly. Otherwise, there will be some comb filter effect on the reconstructed signal. However, a one feature of this scheme is that an exact sample rate match is not required to recover the signal although the quality will be degraded.

Figure 5:
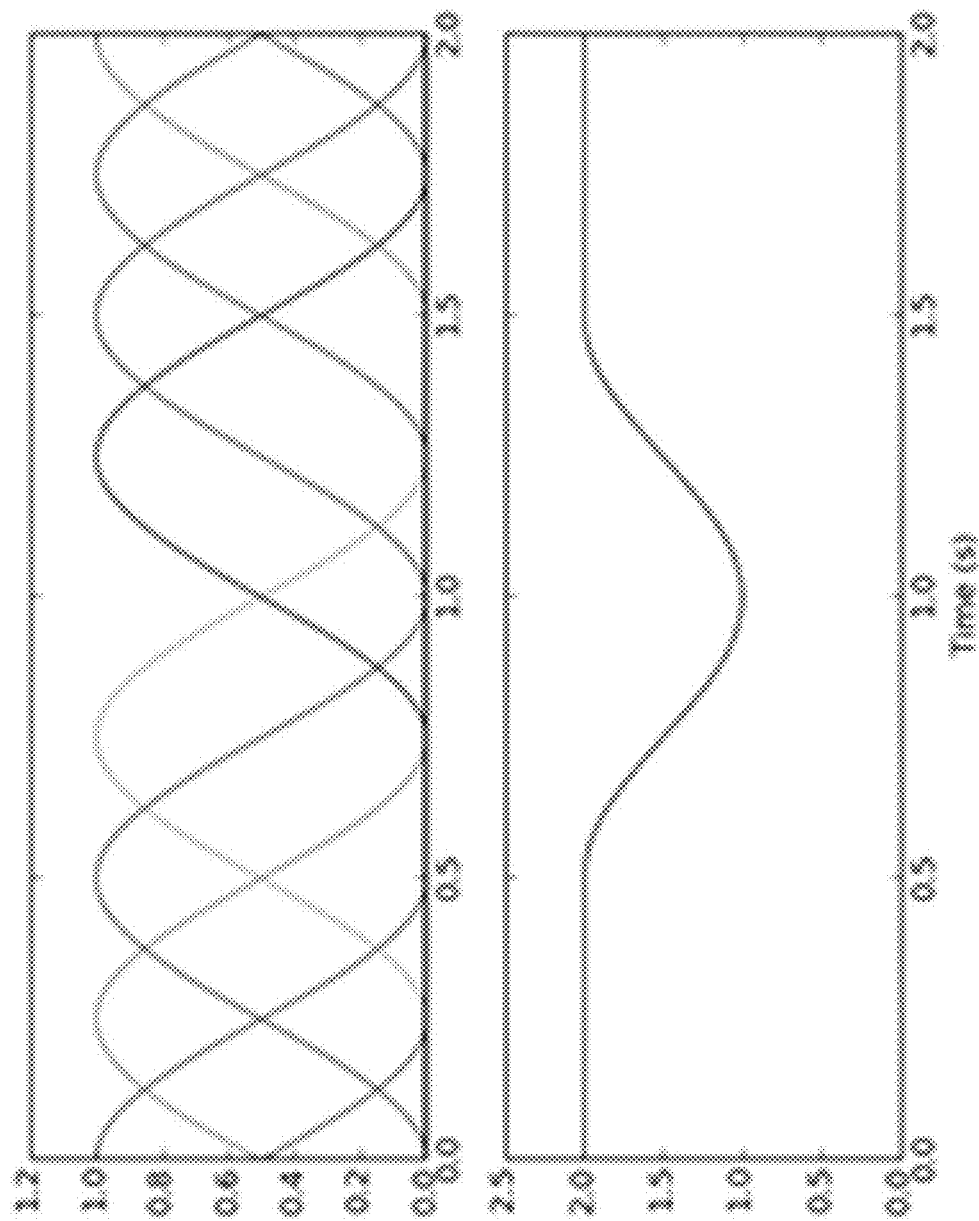
FIG. 5 illustrates that a frame centered at t=1.0 s was not recovered, resulting in a drop in amplitude from 2.0 to 1.0. In this example, the fractional hop size is 0.25 and the relative drop in amplitude is 50%.

The effect of frame loss is tolerable in that it creates a momentary drop in the amplitude of the output signal as shown in FIG. 5. This creates a kind of graceful degradation that is not typically present in digital schemes. As the fractional hop size δ decreases, the relative drop in amplitude from the loss of a single frame is reduced.

Complex Signals

Complex signals can also be used beyond simply applying single-sideband modulation. First, there is the possibility of I/Q multiplexing two separate real signals. Since they are orthogonal, they can be separated at the receiver. A second approach is to transmit half of the overlapping windows for a single signal in quadrature. A third and probably most important possibility is to apply the technique to the complex baseband output of a digital modulator. This may be any existing system such as GSM, WiFi, LTE or future communications standard of suitable bandwidth. Complex baseband and the corresponding real passband signals offers several possibilities. Analytic complex baseband signal can be created with a Hilbert transform and upconverted to make a single sideband real passband signal. Two separate real baseband signals can be I/Q multiplexed. Since they are orthogonal, they can be separated at the receiver. Overlapping message windows can be alternated between the I/Q channels. The I and Q windows can be offset by 50% of the window size so that the amplitude nulls in the I channel and amplitude peaks in the Q channel happen at the same time. This will keep the envelope more constant and be less demanding on the power amplifier. This technique would also help to reduce I/Q crosstalk. In other examples, the complex baseband output of a digital modulator such as QAM or OFDM is used.

Representative Implementations

Figure 6:
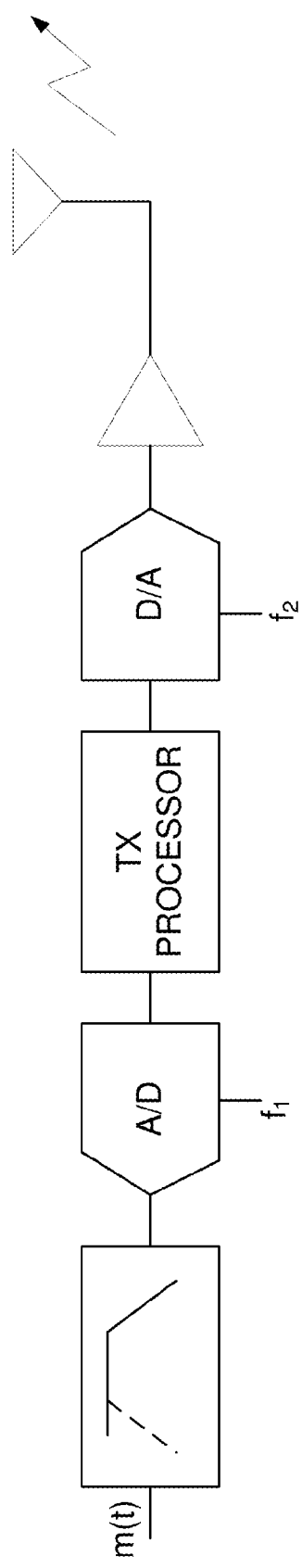
FIGS. 6-7 illustrate a simplified system.
Figure 7:
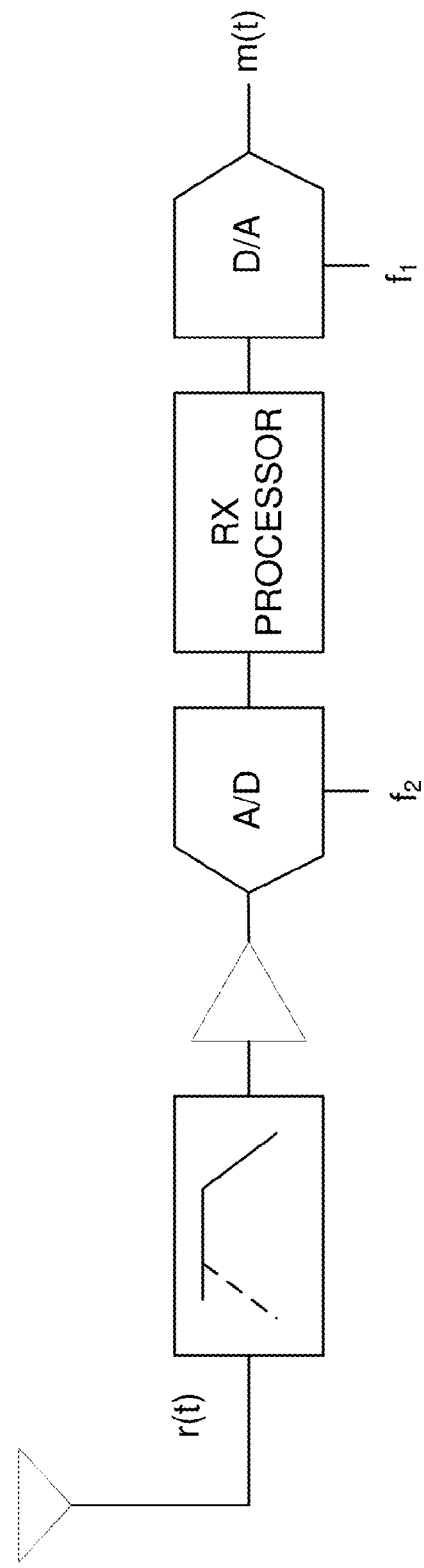

A simplified diagram of the system implementation is shown in FIGS. 6-7. The TX process frames the overlapping segments while the RX process synchronizes and performs the overlap-add reconstruction of the message signal. Two different implementations of the system are described here.

First, a USRP-based system is described which, combined with the GNURadio software, provides a flexible experimentation platform. This implementation was used to quickly gather elementary results about this type of system.

Second, a wideband SDR system is described, capable of bandwidths approaching that of UWB. This system operates in real time and simulates a TDM system supporting several thousand users.

Figure 8:
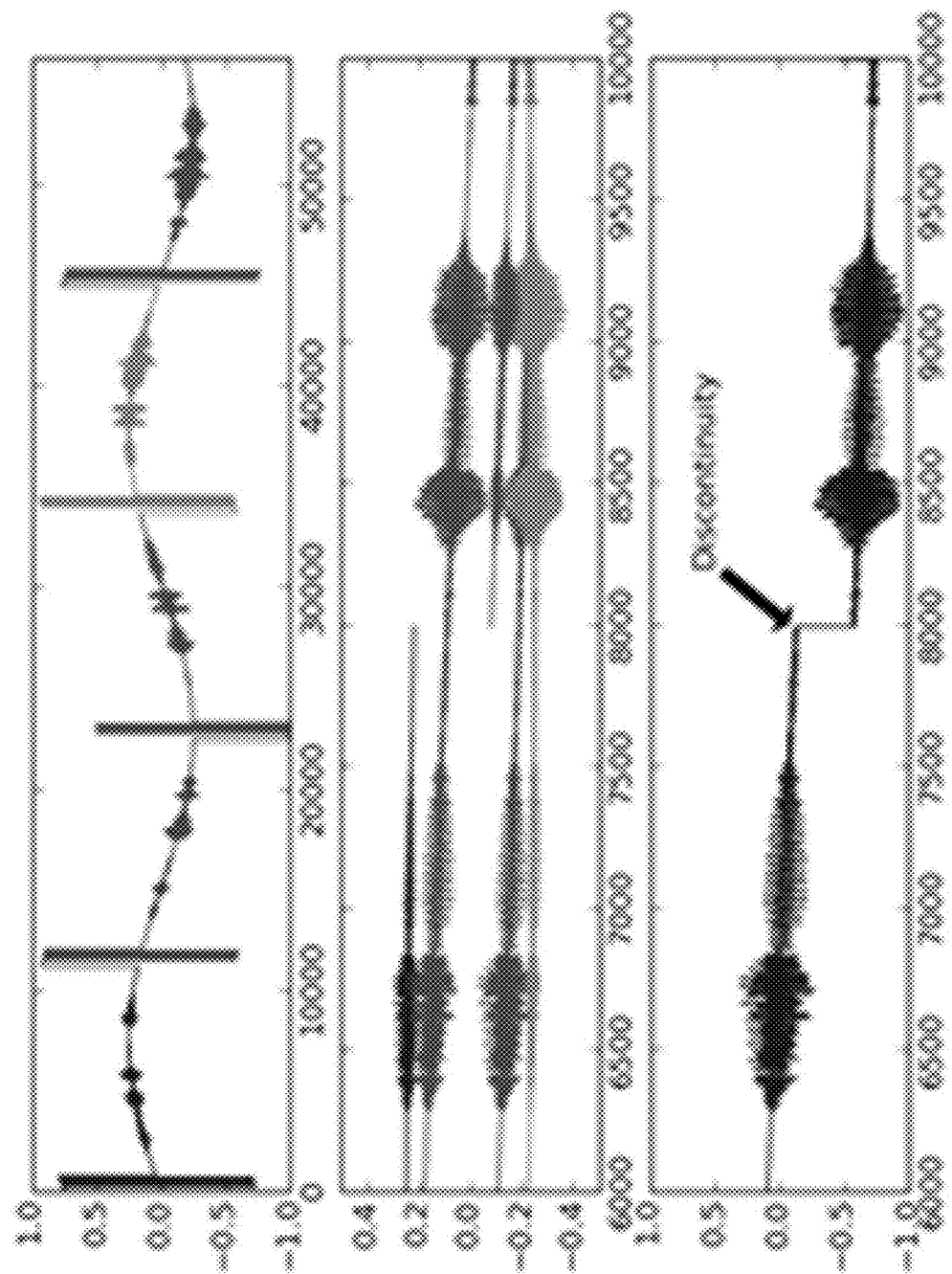
FIG. 8 illustrates discontinuity caused by interference when a rectangular window is applied at the receiver.

In both implementations, a square-root Hanning window is applied to the segments at both the transmitter and receiver, giving the desired Hanning window shape overall on the segments. At the transmitter it helps to reduce sharp transients at the segment boundaries, thus limiting the bandwidth of the transmitted signal. At the receiver, it helps to reduce transients caused by interfering signals which would be present if a Hanning window was applied at the transmitter and a simple rectangular window was applied at the receiver as shown in FIG. 8.

USRP Implementation

Figure 9:
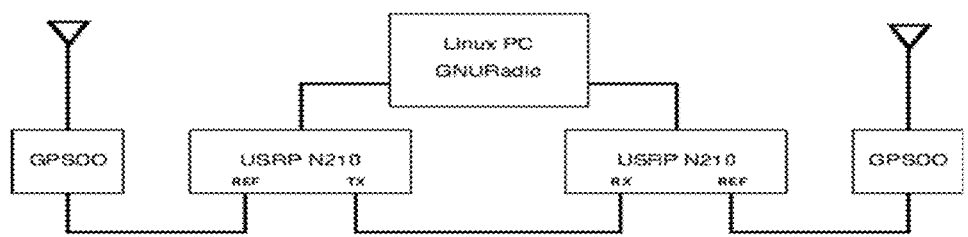
FIG. 9 illustrates a USRP-based system.

A block diagram of this implementation is shown in FIG. 9. The system consists of two commercially available USRP N210 software defined radios from Ettus Research and two Thunderbolt E GPS-disciplined oscillators (GPSDO) from Trimble.

All segment framing and message recovery were performed offline in software. This system was used simulation the transmission of a single input signal with a very high level of redundancy. The GNURadio software allows quick simulation of various channel scenarios.

The USRPs are synchronized to the 10 MHz outputs of separate GPS units to provide a realistic simulation of frequency and phase offsets between units located at different sites. LF cards covering 0-30 MHz and WBX cards covering 50 MHz-2200 MHz were available, so some tests were performed at both 10 MHz and at 900 MHz for comparison.

The system parameters were chosen as in Table 1. A timing marker is added to each segment in the form of a 1000-sample exponential sine sweep. Each segment is then padded on either side with 500 samples to create a 10,000-sample frame.

TABLE 1

System parameters for USRP-based implementation.

| Parameter | Value |
|---|---|
| $f_m$ | 8 kHz |
| $f_c$ | 500 kHz |
| M | 8000 |
| R | 160 |

Wideband SDR

The system parameters for this implementation are shown in Table 2. The ratio of the sample rates results in bandwidth spreading by a factor of 28,125. A system of this type could support a very high number of users in the TDM case or a very high level of redundancy. In our tests we use it to simulate the TDM case.

TABLE 2

System parameters for wideband SDR implementation.

| Parameter | Value |
|---|---|
| $f_m$ (kHz) | 8 |
| $f_c$ (MHz) | 225 |
| β | 28,125 |
| M | 8000 |
| R | 2000 |
| δ | 0.25 |
| Timing Marker (samples) | 1,000 |
| Frame Length (samples) | 11,250 |
| Frame Period (us) | 50 |
| Processing Delay (ms) | 2000 |

Figure 10:
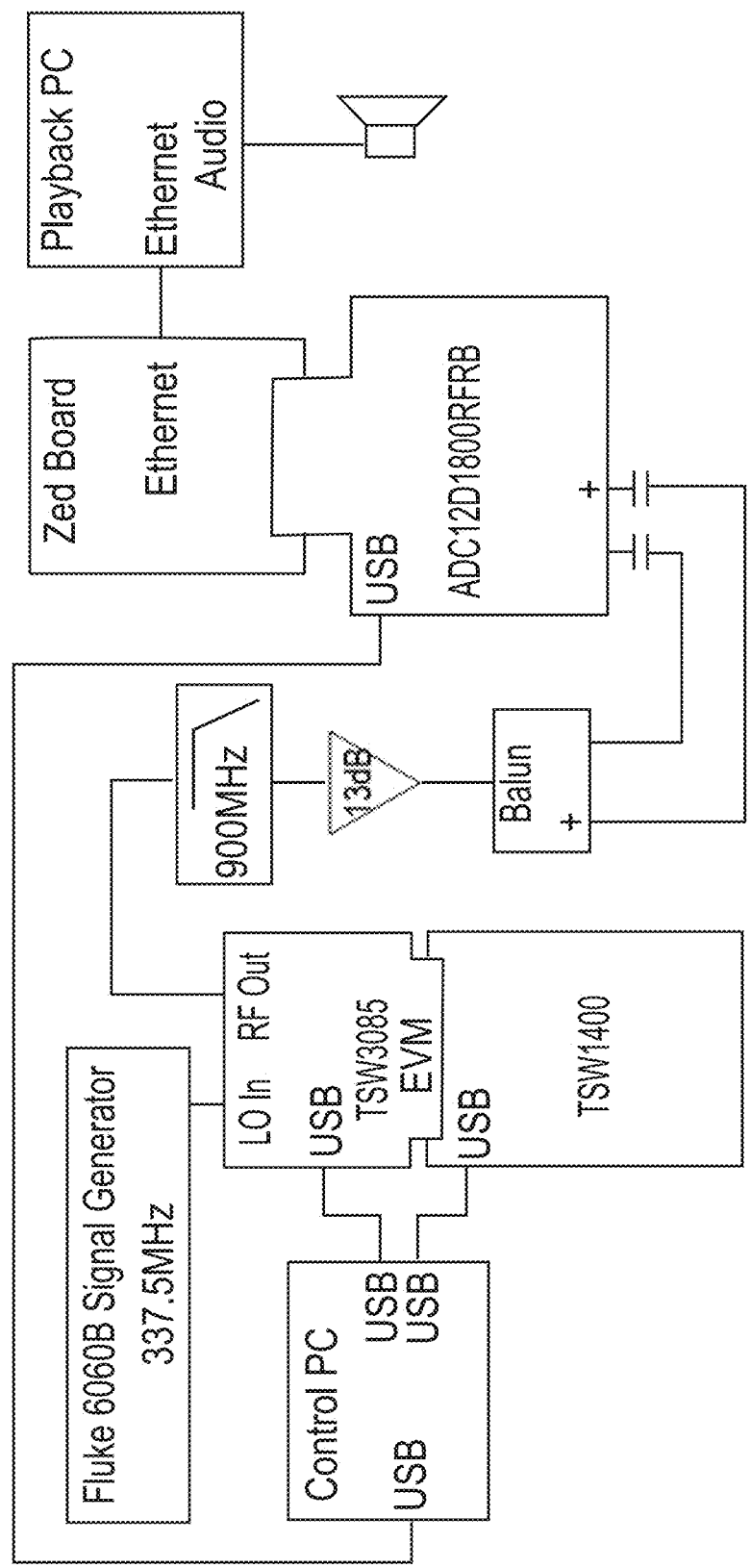
FIG. 10 is a block diagram of a representative hardware interconnection diagram. A USB connection between the Control PC and ADC12D1800RFRB is used to load an FPGA image.

A more detailed diagram of the hardware interconnects is shown in FIG. 10. The transmit and receive hardware as well as the software are discussed in more detail in the following sections.

Transmitter

The TSW1400 evaluation platform from Texas Instruments is used as a transmitter. It plays samples from a user-specified data file through the attached DAC at a configured rate. To produce the data file, a 30.75 second audio file containing speech sampled at $f_m$=8 kHz was divided into 119 segments of 8000 samples each with 25% overlap. The window function applied is a square-root Hanning window. In practice this is just a half-cycle of a cosine function. Framing overhead and padding were added such that each frame contains 11250 samples. The frame overhead efficiency is 71% (8000/11250) and more efficient schemes could be developed. This was convenient scheme given the hardware constraints.

Figure 11:
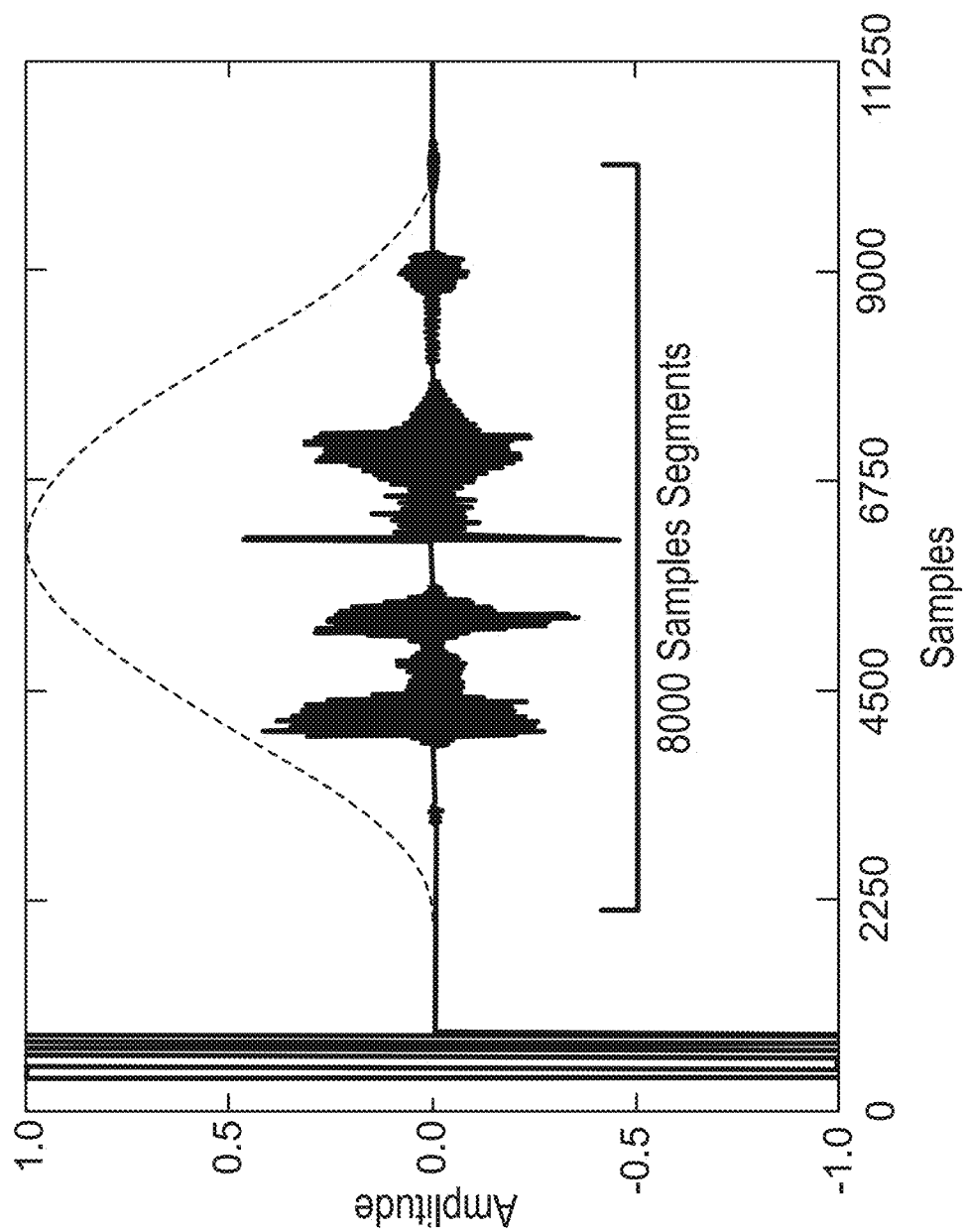
FIG. 11 illustrates a transmitted frame format. The dashed line shows the Hanning window function.

FIG. 11 shows the transmitted frame format. As with the previous system implementation, the synchronization marker used is an exponential sine sweep 1000 samples long. It should be noted that the choice of timing marker can be any sequence with good correlation properties. A Barker code sequence of length 13 modulated with binary phase shift keying (BPSK) was also used experimentally.

These samples are played in a continuous loop through the DAC3482 at $f_c$=225 MHz, resulting in a frame time of 50 μs, frame rate of 20 k frames/sec, and bandwidth up to 112.5 MHz.

An RF modulator was used to mix the output signal s(t) with a carrier frequency $f_0$=337 MHz, creating a dual sideband suppressed carrier signal with bandwidth up to 225 MHz.

Receiver

Figure 15:
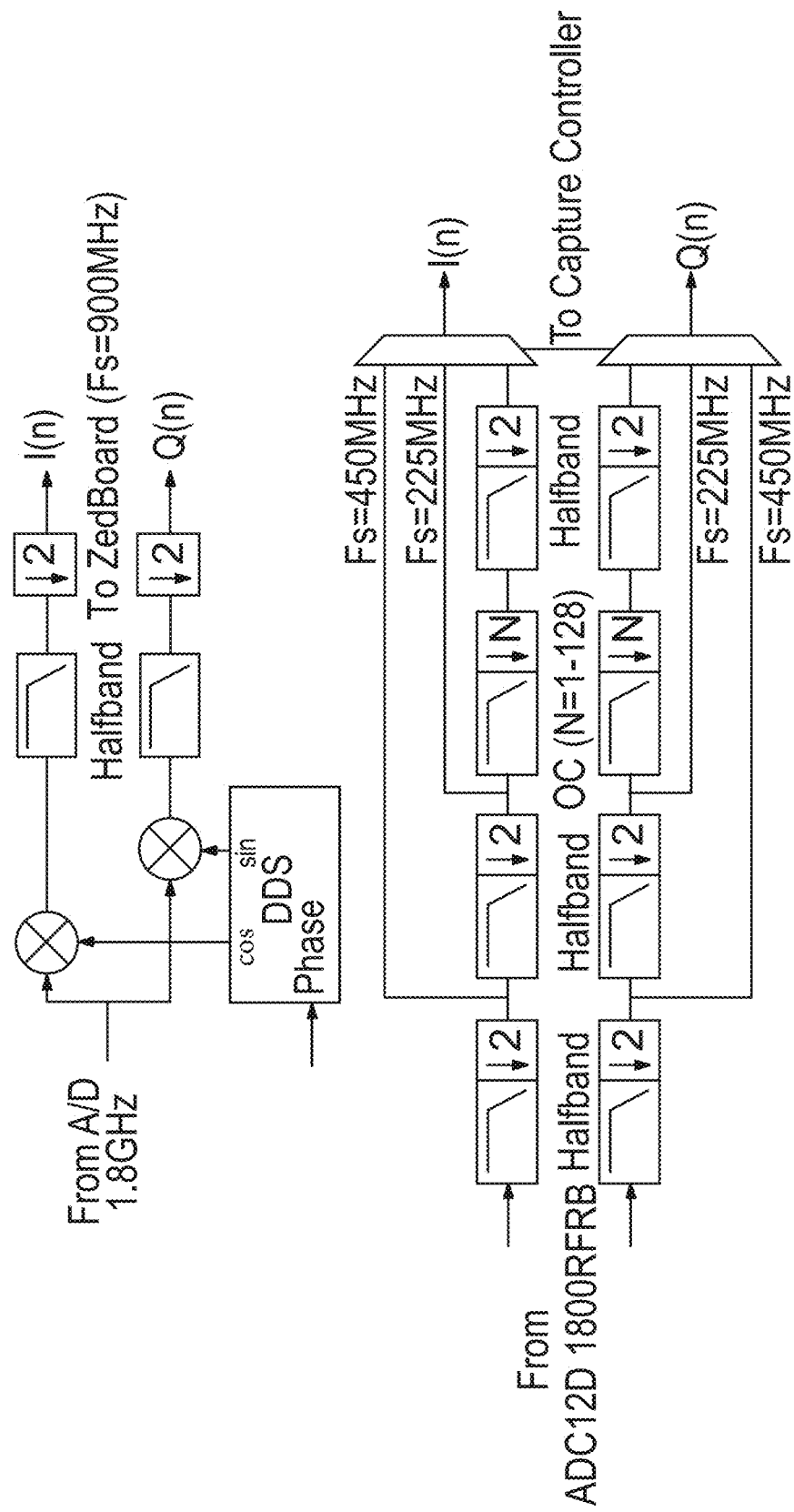
FIG. 15 illustrates receiver DSP. The ADC12D1800RFRB image was modified to include a bank of CORDIC processors and a halfband filter. The ZedBoard FPGA image was modified to include a series of halfband filters and a CIC.

In this example, the receiver hardware consists of a ADC12D1800RFRB evaluation board from Texas Instruments and a Zedboard from Digilent. This combination of devices is used as a wideband direct-sampling software-defined radio with a sample rate of 1.8 GHz. The FPGA images have been modified to include a digital down converter with decimation rates from ranging from 4 to 2048, as shown in FIG. 15.

Figure 16:
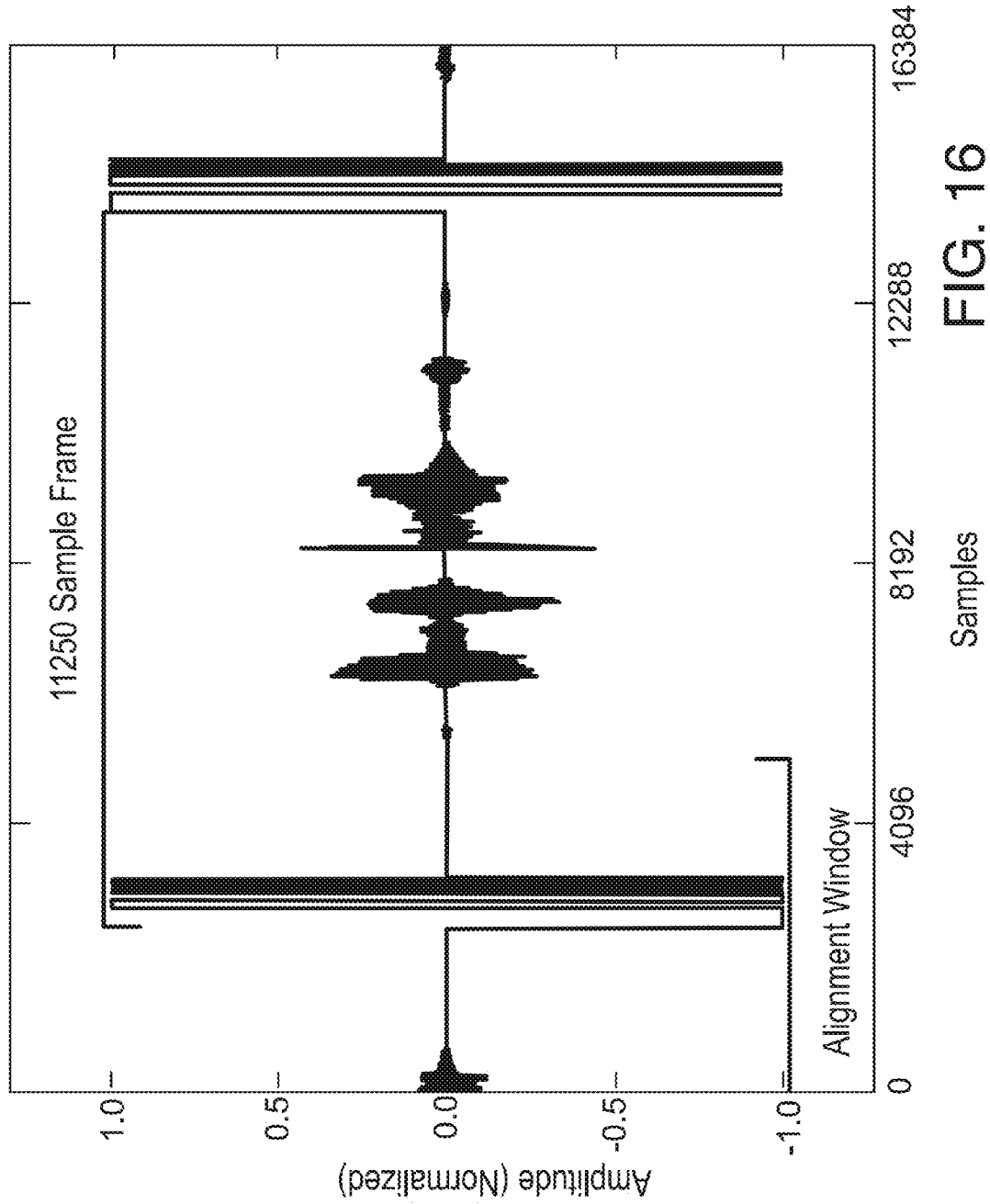
FIG. 16 illustrates received data showing the timing marker within the alignment window.

A hardware timer is programmed to capture buffers of 16,384 samples every 0.25 seconds (corresponding to the audio segment rate) and place the samples in memory. This results in a capture buffer which is larger than the transmitted frame size as in FIG. 16. This feature of the system allows the frame timing to be imprecise, as long as the timing marker consistently appears within the alignment window.

The receiver software runs a tracking algorithm to center the frame in the capture buffer. The capture timer is manipulated until the timing marker is held stable within the alignment window. The phase and frequency offsets are then estimated from the timing marker. This estimate is used to compensate the frequency and phase offset in the audio samples. The extracted samples are then put into an overlap-add process to recover the original signal. The output from the overlap-add process is chunked into buffers of 1024 samples for live audio playback.

As there are only 119 frames (5.95 ms), the data file will play 42 times +2 frames (5000 frames=0.25 sec). In our example system we actually use 4999 frames=0.24995s (42 times+1 frame). It is acknowledged that this results in a recovered sample rate slightly faster than the nominal audio rate of 8 kHz. This was done to prevent buffer underruns in the playback hardware as the playback clock is not derived from the same source as the ADC sample clock. In an ideal system playback hardware sample rate would be controlled and this issue would not arise.

In this system, the 4998 ignored frames could contain data from additional users. Therefore, this system simulates a TDM system supporting up to 4999 channels where the receiver only processes one of the channels. To create a practical system supporting this many users, some kind of channel identifier needs to be included with the framing overhead. In a system like this where the time between frames is very long relative to the sample time, the receiver's digital down converter (DDC) could be disabled to save power.

USRP Implementation

The exponential sine sweep method of impulse response estimation was applied to evaluate the response of simple channel. The method used is described in Eq. (7), where $\mathcal{F}$ denotes the discrete Fourier transform (DFT) operation.

$$h[n] = \mathcal{F}^{-1}\left(\frac{\mathcal{F}(y[n])}{\mathcal{F}(x[n])}\right) \quad (7)$$

The discrete-time signal x[n] represents a discrete version of the exponential sweep as in Eq. (8)-(10), where $\omega_1$ and $\omega_2$ are the start and stop frequencies and T is the duration of the sweep (insert reference). The discrete time signal y[n] is the output of the overlap-add process.

$$s(t) = \sin[K(e^{-t/L} - 1)] \quad (8)$$

$$K = \frac{\omega_1 T}{\ln\left(\frac{\omega_1}{\omega_2}\right)} \quad (9)$$

$$L = \frac{T}{\ln\left(\frac{\omega_1}{\omega_2}\right)} \quad (10)$$

Figure 17A:
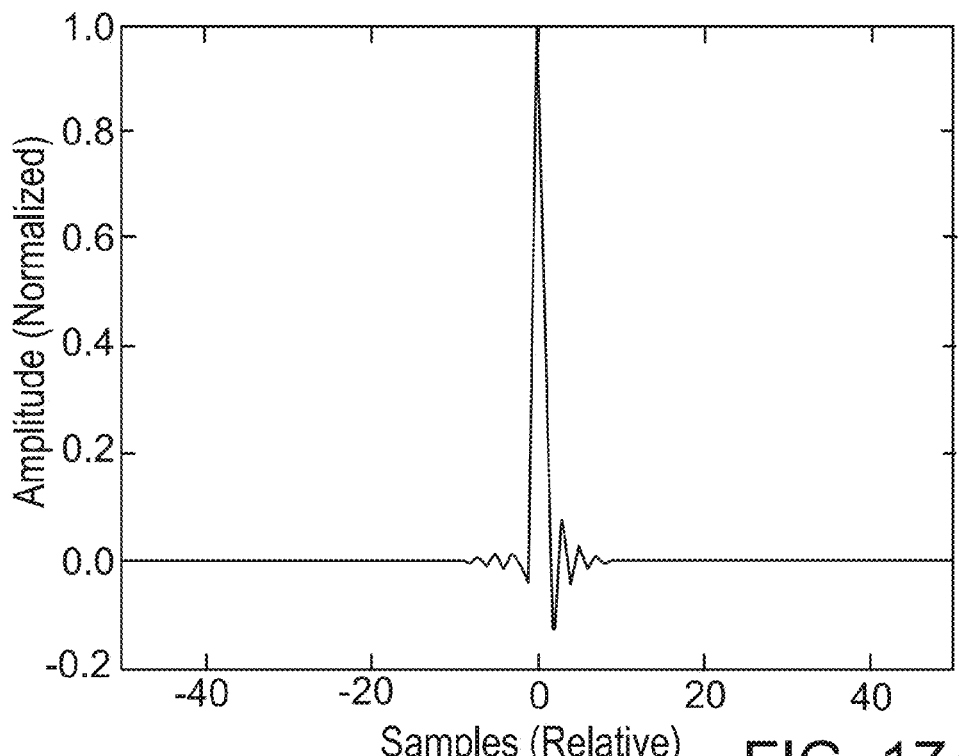
FIG. 17A illustrates a recovered impulse response with simple wired channel.

As expected, the channel response is very flat, except for some attenuation at high frequencies. This could be due to digital filters in the USRPs or cancellation due to jitter in window positioning. This result indicates that the transmission and recovery processes are not significantly affecting the message signal. The recovered impulse response is shown in FIG. 17A.

Additional signals that were tested with this configuration include two audio signals sampled at 8 kHz, wherein segments from the two sources were coded with columns from H(2) to create a simple CDMA signal. The channels were separated at the receiver with no perceptible crosstalk. In a sense, this is analogous to the CDMA downlink situation where all of the coded frames are transmitted in perfect synchronization.

Waveforms of digital modulation schemes were generated using the amateur radio software FlDigi. Modes that use at least 50% of the available bandwidth were considered such as 2xPSK1000R (2.4 kHz). These generated signals were played through the system and the recovered signals were then successfully decoded by FlDigi.

Figure 17B:
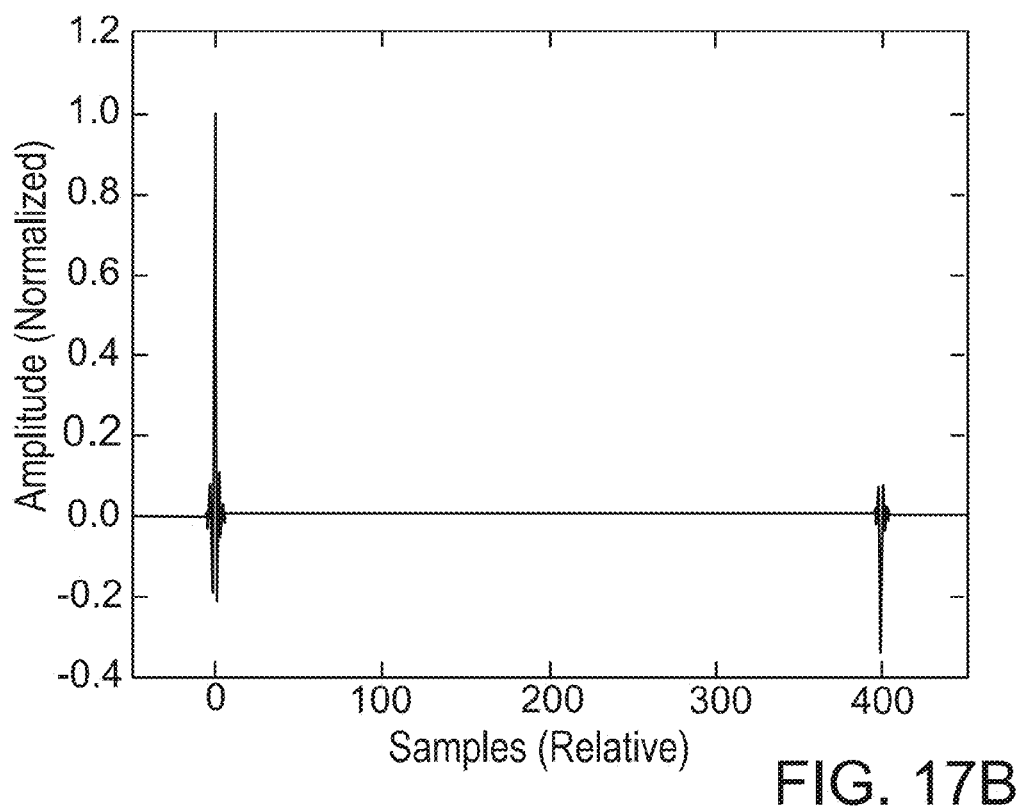
FIG. 17B illustrates a recovered impulse response using two-ray model.

A two-ray model was simulated in the transmission path using an FIR filter implemented in GNURadio having a second tap at 400 samples with an amplitude of −0.35. The channel impulse response was again estimated using the previously-described method. The recovered impulse response agrees with the simulated channel parameters as shown in FIG. 17B.

To gain an intuitive understanding of this effect, an audio speech signal was transmitted through the system. The delay of 400 samples at the channel sample rate (800 μs) manifests as a delay of 400 samples at the audio (message) sample rate (50 ms). This is precisely as described McGibney, U.S. Pat. No. 6,606,312, where the channel response is expanded in time by the ratio of sampling rates.

As a short exponential sine sweep is used as a synchronization marker in this system, it is possible to estimate and compensate for this channel on a frame-by-frame basis. First, an inverse filter is estimated as in Eq. (11) which is essentially just the opposite of Eq. (7). This filter is then applied to the audio segment samples before putting them into the overlap-add process. The result is that the echo is removed from the audio speech signal.

Of course there are several drawbacks to this approach, including poor estimation of the channel in a deep fade, frequency interpolation, and limitations on the channel delay relative to the frame length. An adaptive equalizer or MSE solution (provide reference) could provide better results. However, this method was shown to be able to adapt to a time-varying frequency-selective channel provided the channel is relatively constant over the frame period.

$$h_{inv} = \mathcal{F}^{-1}\left(\frac{\mathcal{F}(x[n])}{\mathcal{F}(y[n])}\right) \quad (11)$$

Finally, a Rayleigh fading channel is simulated in the transmission path, using the model of Alimohammad, et al., "Compact Rayleigh and Rician fading simulator based on random walk processes," IET Communications, vol. 3, pp. 1333-1342 (2009), as represented in GNURadio version 3.7.3. The normalized Doppler frequency $f_D$ is configured such that the coherence time is on the order of the frame rate of 20 ms but still much faster than the segment time of 1 second. The results indicate that even without any AGC the scheme is robust against slow fading as the result is averaged over many frames.

The coherence time was then modified to be faster than the frame rate. In this test the signal recovery was poor, indicating that the naïve recovery scheme presented here may not be suitable for fast-fading channels. One could investigate recovery schemes that are more robust or, if possible, choose the system parameters such that the channel is slow-fading relative to the frame rate.

On the topic of system parameter choice, it is acknowledged that the choice of $M=f_m=8000$ creates a delay of 1 second in the transmit process and 1 second in the receive process. In a broadcast scenario, this 2-second delay may be tolerable. However, in a two-way communications system this delay would render the system impractical.

A modification to this system was tested wherein the fractional hop size was held constant while the segment length was reduced to 250 samples. This reduces the delay time to a more practical 62.5 ms. Instead of framing each segment, the segments are framed in groups of 32 so that the frame size stays the same. This provides no additional protection to fading, so the system was again modified such that the segment length was 384 and the timing marker was 64 samples with an overall frame time of 1 ms and a hop size of 8 samples. This gives a similar performance but with faster fading tolerance.

While DSB-SC signals generated from real sampled signals have been considered in some examples, complex baseband signals can be used as well.

Wideband System

The primary observation obtained with this system is that the technique can be scaled up to very wideband transmission using modern high-speed DACs and ADCs.

A speech signal was transmitted through the system and found to be intelligible although quality is noticeably degraded. One source of this degradation could be explained by the lack of interpolation used on the DAC. In typical in SDR transmitters the DAC is interpolated by a factor of at least 2.

Another source of degradation is the fact that, unlike the USRP-based system, the sample clocks are not derived from any disciplined clock source. This could also explain the result of the sine sweep test, where the impulse response appears to vary significantly with each trial. Given that this system has a low level of redundancy, poor synchronization and sample rate mismatch have a greater impact on the recovered signal.

Figure 18:
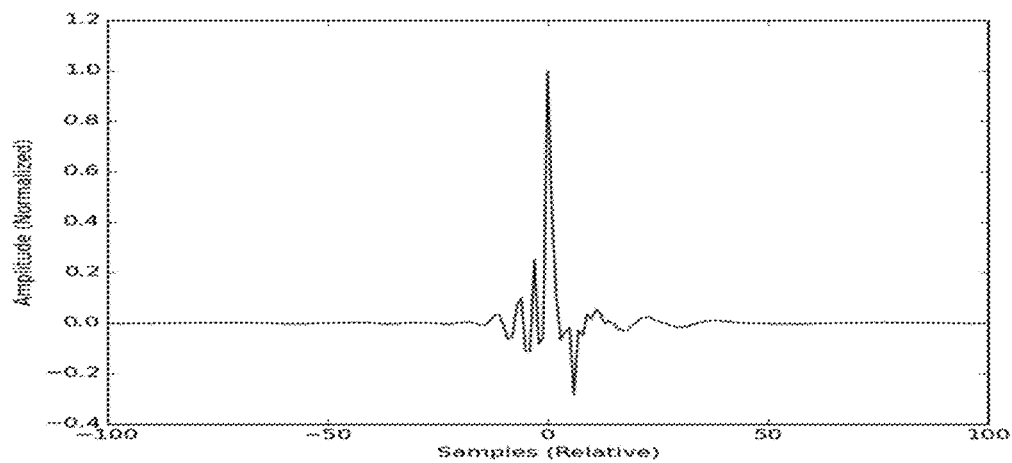
FIG. 18 illustrates averaged impulse response over 8 sweeps.

FIG. 18 shows an averaged impulse response over 8 trial sweeps. Although the impulse response still varies significantly, there are definitive features that appear. Working within the constraints of the current hardware setup, a possible way to improve the results is to reduce the fractional hop size to ⅛ by adding an additional window in quadrature with each frame.

In view of the many possible embodiments to which the principles of the disclosed technology may be applied, it should be recognized that the illustrated embodiments are only representative examples and should not be taken as limiting the scope of the disclosure. Alternatives specifically addressed in these sections are merely exemplary and do not constitute all possible alternatives to the embodiments described herein. For instance, various components of systems described herein may be combined in function and use. We therefore claim as our invention all that comes within the scope and spirit of the appended claims.

We claim:

1. A method, comprising:
    dividing a first message signal associated with a message rate $f_m$ into a series of overlapping segments having a predetermined length and overlap; and
    transmitting the segments serially at a channel rate $f_C$ that is higher than the message rate $f_m$, wherein the channel rate $f_c$ is selected based on the predetermined length and overlap so as to accommodate redundancy associated with the division into overlapping segments.

2. The method of claim 1, further comprising applying a window function to each segment of the first message signal.

3. The method of claim 2, wherein the window function is a sine, Hanning, trapezoidal, rectangular, or Blackman window function.

4. The method of claim 2, wherein the channel rate $f_C$ is selected based on the predetermined length M and overlap R and the message rate $f_m$ such that $f_C>(M/R)f_m$ so that the segments are transmitted without overlap.

5. The method of claim 4, further comprising;
    dividing a second message signal into a series of overlapping segments having a second predetermined length and overlap;
    applying a window function to each segment of the second message signal;
    interleaving the windowed segments of the first message signal with the windowed segments of the second message signal; and
    transmitting the interleaved segments or data elements serially.

6. The method of claim 4, wherein the channel rate, overlap and segment length are modified dynamically based on channel conditions.

7. The method of claim 4, wherein synchronization markers are used to identify the beginning of a segment or group of segments.

8. The method of claim 4, wherein adaptive equalization is used to compensate for frequency-selective fading.

9. The method of claim 1, wherein the message rate is a first message rate, and further comprising:
    dividing a plurality of message signals associated with at least the first message rate and a second message rate into respective series of overlapping segments having the predetermined length and overlap; and
    transmitting the segments of the plurality of message signals serially at the channel rate.

10. The method of claim 9, wherein the channel rate $f_C$ is at least $$\sum_{i=1}^{2} \frac{f_i}{\delta_i},$$

wherein $f_1$ is the first message rate, $f_2$ is the second message rate, $\delta_i = R_i/M_i$, and $M_1$, $M_2$ and $R_1$, $R_2$ and are the predetermined lengths and overlaps associated with the first message signal and the second message signal, respectively.

11. The method of claim 4, further comprising;
    dividing a second message signal into a series of overlapping segments having a second predetermined length and overlap;
    applying a window function to each segment of the second message signal; and
    applying a first code sequence of length N and a second code sequence of length N to the respective series of windowed segments associated with the first message signal and the second message signal, respectively, so as to define corresponding coded series of segments, wherein the serially transmitted code segments includes N coded series of segments, wherein N is a positive integer.

12. The method of claim 11, wherein the code sequences correspond to rows of a Hadamard matrix H ($2^k$), wherein k is a positive integer.

13. The method of claim 1, further comprising dividing a plurality of message signals associated with at least one message rate into a series of overlapping segments having predetermined lengths and overlaps; and
    transmitting the segments serially at a channel rate that is higher than a combined message rate, wherein the channel rate is selected based on the predetermined lengths and overlaps so as to accommodate redundancy associated with the division into overlapping segments.

14. The method of claimer 4, wherein the segments are transmitted serially by modulating the segments onto a carrier wave.

15. The method of claim 14, where the modulation is done by creating an analytic complex baseband signal with a Hilbert transform and then upconverting to make a single sideband real passband signal.

16. The method of claim 4, where the segments are divided into two groups, and I/Q multiplexing the two groups of segments.

17. The method of claim 4, further comprising:
    dividing a second message signal into a series of overlapping segments having a second predetermined length and overlap; and
    I/Q multiplexing the segments of the first message signal with the segments of the second message signal; and
    transmitting the segments serially.

18. The method of claim 17, wherein the second message signal corresponds to the first message signal with a time-delay.

19. The method of claim 16, wherein segments associated with the I and Q channels are temporally offset.

20. The method of claim 19, wherein the segments associated with the I and Q channels are offset by 50% of the segment length so that amplitude nulls in an I channel and amplitude peaks in a Q channel occur at a common time so as to reduce signal envelope amplitude variations.

21. The method of claim 4, wherein the message is a real passband output of a digital modulator.

22. The method of claim 4, wherein the message is a complex baseband output of a digital modulator.

23. A method, comprising:
identifying a plurality of segments in a serially received data signal at a channel rate;
processing the segments based on a segment length and overlap to obtain a message signal, wherein a message rate associated with the message signal is less than the channel rate, wherein the channel rate is selected based on the predetermined length and overlap so as to accommodate redundancy associated with a division into overlapping segments.

24. The method of claim 23, further comprising windowing each of the segments prior to processing to obtain the message signal.

25. The method of claim 23, wherein the message rate $f_m$ is selected such that $F_m < \delta f_C$, wherein $f_C$ is the channel rate, $\delta = R/M$, R is the overlap and M is the segment length.

26. The method of claim 23, wherein the serially received data signal at the channel rate includes segments associated with at least a first message signal and a second message signal, wherein the processing produces the at least one of the first message signal and the second message signal based on the predetermined length and overlap.

27. The method of claim 26 wherein at least one of the first message signal and the second message signal are produced based on associated code sequences.

28. The method of claim 23, wherein the channel rate $f_C$ corresponds to a sum $$\sum_{i=1}^{2} \frac{f_i}{\delta_i},$$

wherein $f_1$ is a first rate associated with a first message signal, $f_2$ is a second rate associated with a second message signal, $\delta_1 = R_1/M_1$, $\delta_2 = R_2/M_2$ and $R_1$, $R_2$ and $M_1$, $M_2$ are predetermined overlaps and segment lengths associated with the first message signal and the second message signal, respectively.

29. The method of claim 23, further comprising:
identifying a plurality of segments in a serially received data signa a channel rate, the plurality of segments associated with two or more message signals;
processing the segments based on a segment length and overlap to obtain at least one of the message signals.

30. The method of claim 23, further comprising:
processing the segments based on segment lengths and overlaps associated with corresponding message signals to obtain at least two message signals.

31. An apparatus, comprising:
a data input that receives a sequence of data samples;
a data processor that receives the sequence of data samples and defines a series of overlapping segments having a predetermined length and overlap; and
a data convertor that produces a serial data signal based on the series of overlapping segments, wherein the received sequence of data samples is received at a message data rate, and the serial data signal is at a channel data rate, wherein the channel data rate is greater than the message data rate.

32. The apparatus of claim 31, wherein the channel data rate is $f_C$ is at least $$f_C = \frac{f_m}{\delta},$$

wherein $f_m$ is the message data rate, $\delta = R/M$, R is the overlap and M is a segment length.

33. The apparatus of claim 31, further comprising an analog to digital converter that produces the sequence of data samples.

34. The apparatus of claim 31, further comprising a modulator that receives the serial data signal and modulates a carrier signal based on the received serial data signal.

35. The apparatus of claim 31, wherein the sequence of data samples is associated with a plurality of data signal such that segments of the plurality of data signals are interleaved, and further comprising a demultiplexer that processes the received sequence of data samples such that the serial data signal is based on overlapping segments associated with a selected data signal of the plurality of data signals.

36. An apparatus, comprising:
a data input that receives a serial data signal based on a series of segments having a predetermined length and
a data processor that receives the serial data signal from the data input and identifies overlapping segments in the serial data signal and produces a de-overlapped serial data signal, wherein the de-overlapped serial data signal is at a message data rate, and wherein the message data rate $f_m$ is less than or equal to $\delta f_C$ wherein $f_C$ is a channel data rate, $\delta = R/M$, R is a segment overlap and M is the predetermined segment length.

37. The apparatus of claim 36, wherein the serial data signal is received at a first data rate, and the de-overlapped serial data signal is at the message data rate, wherein the message data rate is less than the channel data rate.

38. The apparatus of claim 36, wherein the serial data signal is associated with a plurality of data signals such that segments of the plurality of data signals are interleaved, wherein the data processor produces that de-overlapped serial data signal based on a selected data signal of the plurality of data signals.

39. The apparatus of claim 36, wherein the serial data signal is associated with a plurality of data signals, wherein each of the plurality of data signals is associated with a respective code sequence, and the data processor produces the de-overlapped serial data signal based on a selected data signal of the plurality of data signals and the corresponding code sequence.

40. The apparatus of claim 37, wherein the data processor that receives the serial, data signal from the data input and identifies the overlapping segments in the serial data signal, assigns a weight to each segment based on its quality and produces a de-overlapped serial data signal.

\* \* \* \* \*